Figure 1:
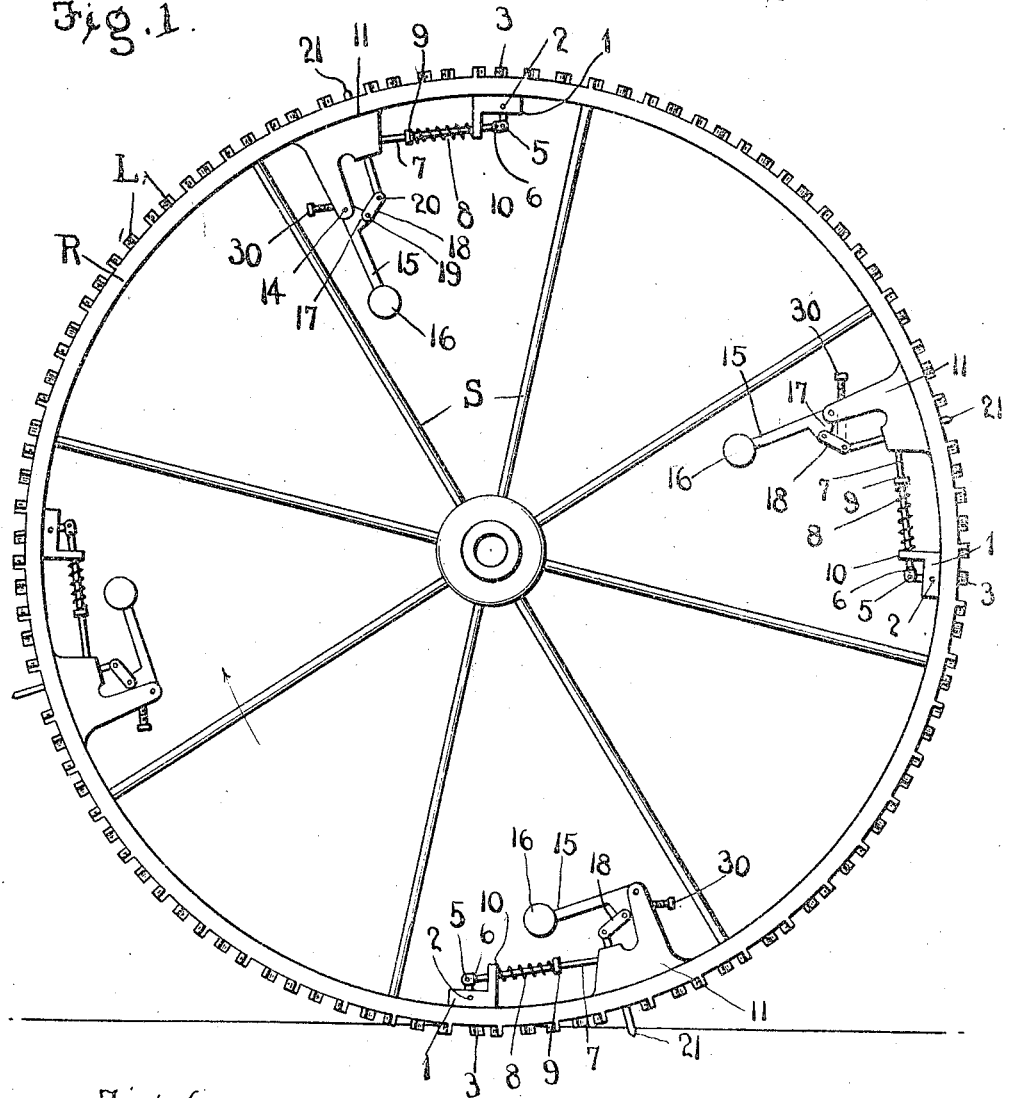

D. L. CLEMENT.
TRACTION WHEEL.
APPLICATION FILED AUG. 26, 1912.

1,052,317.

Patented Feb. 4, 1913.

2 SHEETS—SHEET 1.

Witnesses
L. B. James

Inventor
D. L. Clement
By H. B. Willson & Co.
Attorneys

D. L. CLEMENT.
TRACTION WHEEL.
APPLICATION FILED AUG. 26, 1912.
1,052,317.
Patented Feb. 4, 1913.
2 SHEETS—SHEET 2.
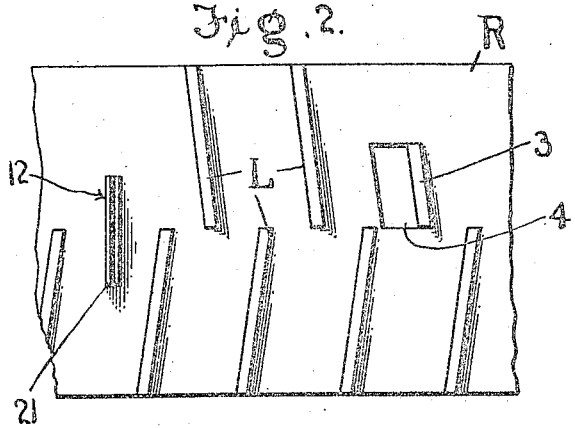
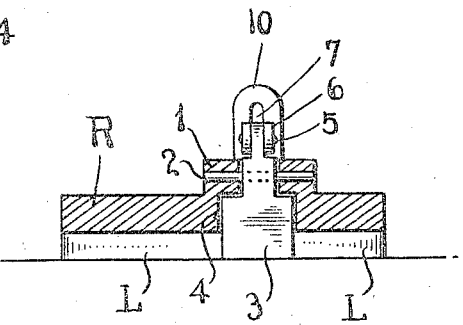
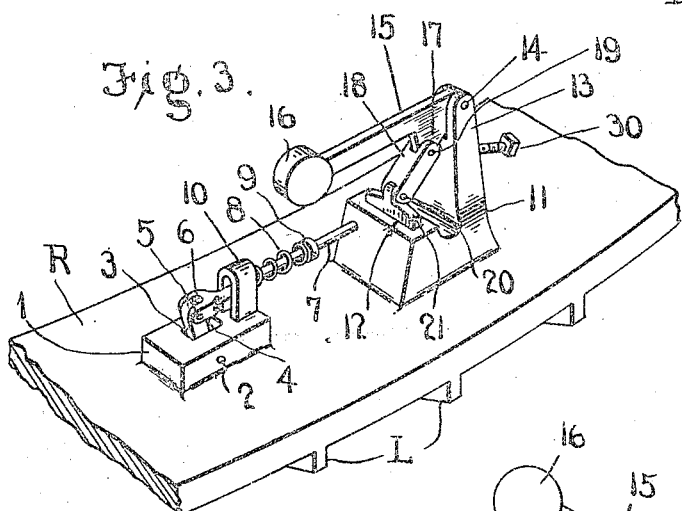
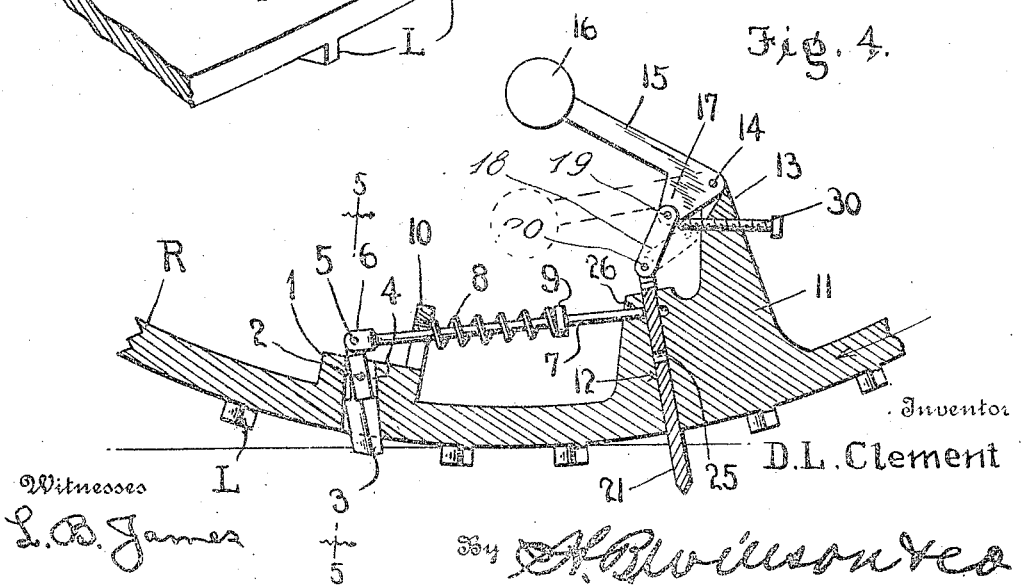
Inventor
D. L. Clement

UNITED STATES PATENT OFFICE.

DON L. CLEMENT, OF EVANGELINE, LOUISIANA.

TRACTION-WHEEL.

1,052,317.  Specification of Letters Patent.  Patented Feb. 4, 1913.

Application filed August 26, 1912. Serial No. 717,189.

*To all whom it may concern:*

Be it known that I, DON L. CLEMENT, a citizen of the United States, residing at Evangeline, in the parish of Acadia and State of Louisiana, have invented certain new and useful Improvements in Traction-Wheels; and I do declare the following to be a full, clear, and exact description of the invention, such as will enable others skilled in the art to which it appertains to make and use the same.

This invention relates to carriages and wagons, and more especially to traction wagons, engines or machines; and the object of the same is to produce an improved tractor wheel having means for preventing it from slipping in soft or sandy soil.

This object is accomplished by providing the rim of the wheel at several points around its circumference with a special form of anti-slipping mechanism constituting the gist of my invention, all as hereinafter more fully described and claimed, and as shown in the drawings, wherein—

Figure 6:
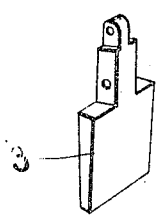
Figure 7:
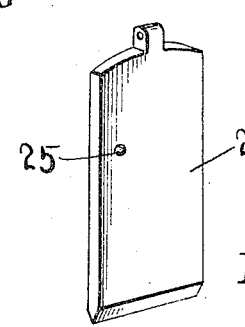

Figure 1 is a side elevation of a traction wheel embodying my invention; Fig. 2 is a detail plan view of a portion of the rim of the wheel; Fig. 3 is a sectional perspective view of a portion of the rim showing the anti-slipping mechanism; Fig. 4 is a longitudinal section through the parts shown in Fig. 3; Fig. 5 is a transverse section taken on line 5—5 of Fig. 4; Fig. 6 is a perspective detail of the element hereinafter called a "supplemental lug," and Fig. 7 is a perspective detail of the element hereinafter called a "tongue."

In the drawings the letter S designates the spokes and R the rim of a traction wheel having the usual lugs L cast on its periphery, either straight across the same or oblique and by preference in staggered relation to each other as usual, the purpose of these lugs being to prevent the slipping of the wheel when power is applied thereto. Secured to the inner side of the rim or preferably cast integral therewith at the time it is made is a lug 1 constituting a casing wherein at 2 is pivoted a supplemental lug 3 which projects radially through an opening 4 in the rim and takes the place of one of the rigid lugs as shown. The opening 4 is of sufficient width to permit the protruding end of the lug 3 to swing a little, with the result that, if the wheel should slip, said end will move forward as the lower side of the rim of the wheel slips rearward, and the inner end of the lug will therefore move rearward. Pivotally connected as at 5 to said inner end is a fork 6 at the rear end of a bolt 7 standing inside the rim R, and the bolt is projected normally forward by means of a spring 8 coiled around it and disposed between an enlargement 9 thereon and a guide 10 on the casing 1.

Secured within or cast as a part of the rim at the time it is made, and disposed forward of the casing 1 in the direction of rotation of the wheel, is a second and larger casing 11 slotted as at 12 near its rear end to form a guide standing radially of the wheel, and provided near its front end with a bracket 13. Pivoted in this bracket at 14 is a lever 15 herein shown as carrying a weight 16, although it is obvious that it could be moved by other means than the gravity of a weight. The inner end of the lever is offset or enlarged as at 17 near its pivot 14 and on its radially outer side to produce one link of a toggle lever, the other link 18 thereof being pivoted at 19 to the enlargement 17. The outer end of the link 18 is pivoted at 20 to the inner end of a rather long and stout tongue 21 which slides through the guide slot 12 and through an opening formed in the rim R in alinement therewith, and this tongue is pierced at a proper point with an eye 25 adapted to pass across a hole 26 through the casing 11 in which hole works the tip of the bolt 7.

With the parts thus constructed, under ordinary circumstances the tongue is retracted so that it protrudes very little if any beyond the rim, and the tip of the bolt is engaged with the eye 25 to hold it so. When now the traction wheel is rotated by power to such an extent that its lower side slips over the earth, the lug 3 will be swung on its pivot, the bolt is drawn against the tension of its spring so as to disengage its tip from the eye 25, and at this time the weight will be in such position that its descent will tend to straighten out the toggle lever comprised by the links 17 and 18, and project the tongue 21 through the slot 12 so that it protrudes sufficiently beyond the rim R to reliably engage the earth and prevent further slipping of the wheel. In the act of straightening out said toggle, the central pivot 19 passes a direct line between the endmost pivots 14 and 20, so that as the wheel continues to rotate and the weight is thrown upon the protruding end of the tongue 21, the latter cannot be forced inward because the inner end of the link 18 rests against the bracket 13 and prevents the toggle from opening. When, however, this portion of the device has passed the lower side of the wheel and commences to ascend on the rear side, the weight finally falls over its pivot 14 and moves its enlargement 17 toward the hub, and this action carries the pivot 19 with it so that the toggle lever is actuated to retract the tongue 21 until the eye 25 of the latter comes in alinement with the bolt 7, when the spring thereof will project its tip into such eye and hold the parts in this position for renewed action as the wheel rotates the second time. However, the spring may be made sufficiently strong to prevent this action of parts unless the wheel slips more than it does ordinarily on the road usually traveled by traction machines. As above suggested, other means than a weight might be employed for projecting the tongue, but I prefer the weight and the toggle lever as described above. In order to hold this device out of action, a screw 30 may be passed through a threaded opening in the bracket 13, and when this screw is turned so far that its tip engages under the link near its pivotal point 20, as shown in dotted lines at the right of Fig. 1, it is obvious that the weight cannot fall to a position where the toggle lever will project the tongue 21, even though the bolt 7 be retracted so that its tip disengages the eye 25. At any time when this device is to operate, the screw 30 is retracted or removed. I would by preference make all parts of metal, and there are four or more of these devices disposed around the periphery of an ordinary traction wheel so that no considerable portion of the face of its tread is left unprovided for. It may not be necessary to employ as many of the devices, or in some cases it might be preferred to have more of them; and I leave it to the manufacturer whether one or both of the traction wheels shall be thus provided.

I do not wish to be limited to the details of construction further than as set forth in the following claims.

I claim—

1. The herein described traction wheel having an opening through its rim, a tongue moving radially through said opening, means carried wholly by the wheel for projecting said tongue, means for locking said tongue when in retracted position, and devices for causing the tripping of the locking means by the slipping of the wheel.

2. The herein described traction wheel having an opening through its rim, a tongue moving radially through said opening, means carried wholly by the wheel for projecting said tongue, means for locking said tongue when in retracted position, said rim being provided with an opening in rear of that above referred to, a lug projecting through the opening and pivoted within the rim, and connections between said lug and locking means for tripping the latter when the wheel slips.

3. The herein described traction wheel having an opening through its rim, a tongue moving radially through said opening, means carried wholly by the wheel for projecting said tongue, a spring-actuated bolt whose tip is adapted to engage said tongue when the latter is retracted, said rim being provided with an opening in rear of that above referred to, a lug projecting through the opening and pivoted within the rim, connections between said lug and locking bolt for actuating said bolt when the wheel slips.

4. The herein described traction wheel having an opening through its rim, a tongue movable through said opening and pierced with an eye, means carried wholly by the wheel for projecting said tongue, and a sliding bolt adapted to engage said eye when the tongue is projected; combined with devices for causing the retraction of said bolt when the wheel slips.

5. The herein described traction wheel having an opening through its rim, a tongue movable through said opening and pierced with an eye, means carried wholly by the wheel for projecting said tongue, and a sliding bolt adapted to engage said eye when the tongue is projected; combined with a lug movably attached to said rim and connected with said bolt for retracting the latter when the wheel slips, and a spring for normally projecting the bolt.

6. The herein described traction wheel having an opening through its rim, a casing secured within the latter and having a hole registering with said opening, a tongue slidably mounted in the hole and opening and adapted to project through the rim, and a bracket mounted on the casing; combined with a lever pivoted within the bracket and having an enlargement adjacent the casing, a weight at the outer end of the lever, and a link pivotally connecting the tongue and enlargement and, with the latter, forming a toggle whose intermediate pivot crosses the line between its endmost pivots when the tongue is projected.

7. The herein described traction wheel having an opening through its rim, a casing secured within the latter and having a hole registering with said opening, a tongue slidably mounted in the hole and opening and adapted to project through the rim, and a bracket mounted on the casing; combined with a lever pivoted within the bracket and having an enlargement adjacent its pivot, means for moving said lever, and a link pivotally connecting the tongue and enlargement and, with the latter, forming a toggle whose intermediate pivot crosses the line between its endmost pivots when the tongue is projected.

8. The herein described traction wheel having an opening through its rim, a casing secured within the latter and having a hole registering with said opening, a tongue slidably mounted in the hole and opening and adapted to project through the rim, and a bracket mounted on the casing; combined with a lever pivoted within the bracket and having an enlargement, a weight at the outer end of the lever, a link pivotally connecting the tongue and enlargement in the form of a toggle lever, spring actuated means for locking the tongue in projected position, and means for tripping said means, when the wheel slips.

9. The herein described traction wheel having an opening through its rim, a casing secured inside the latter and having a hole registering with the opening, a bracket projecting from the casing radially inwardly and out of line with said hole, and a tongue slidably mounted in the hole and opening; combined with a toggle lever whereof one link is pivoted to the inner end of the tongue and the other to the inner end of the bracket and the intermediate pivot crosses a line between the extreme pivots when the tongue is projected so that the outer link then rests against said bracket, and means for moving the intermediate pivot of said toggle away from the bracket to retract said tongue.

10. The herein described traction wheel having an opening through its rim, a casing secured inside the latter and having a hole registering with the opening, a bracket projecting from the casing radially inwardly and out of line with said hole, and a tongue slidably mounted in the hole and opening; combined with a toggle lever whereof one link is pivoted to the tongue and the other to the bracket and the intermediate pivot crosses a line between the extreme pivots when the tongue is projected and the outer link then rests against said bracket, means for moving the intermediate pivot of said toggle away from the bracket to retract said tongue, and a screw adjustable through a threaded opening in said bracket for controlling the movement of said toggle lever in one direction, for the purpose set forth.

In testimony whereof I have hereunto set my hand in presence of two subscribing witnesses.

DON L. CLEMENT.

Witnesses:
 URVIN CLEMENT,
 H. McVEY.